(12) United States Patent
Nanivadekar

(10) Patent No.: US 10,452,486 B2
(45) Date of Patent: Oct. 22, 2019

(54) SELECTING A BACKUP PROCESS FOR A FILE SYSTEM

(71) Applicant: Hewlett Packard Enterprise Development LP, Houston, TX (US)

(72) Inventor: Mandar Nanivadekar, Banglore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 532 days.

(21) Appl. No.: 15/114,954

(22) PCT Filed: Jan. 30, 2014

(86) PCT No.: PCT/US2014/013827
§ 371 (c)(1),
(2) Date: Jul. 28, 2016

(87) PCT Pub. No.: WO2015/116098
PCT Pub. Date: Aug. 6, 2015

(65) Prior Publication Data
US 2016/0342481 A1    Nov. 24, 2016

(51) Int. Cl.
*G06F 16/00* (2019.01)
*G06F 11/14* (2006.01)
*G06F 3/06* (2006.01)
*G06F 16/11* (2019.01)
*G06F 11/30* (2006.01)

(52) U.S. Cl.
CPC .......... *G06F 11/1451* (2013.01); *G06F 3/065* (2013.01); *G06F 3/0619* (2013.01); *G06F 3/0644* (2013.01); *G06F 3/0673* (2013.01); *G06F 11/1458* (2013.01); *G06F 11/1469* (2013.01); *G06F 16/113* (2019.01); *G06F 11/1461* (2013.01); *G06F 11/3034* (2013.01); *G06F 2201/81* (2013.01)

(58) Field of Classification Search
CPC ............................ G06F 11/1469; G06F 8/443
See application file for complete search history.

(56) References Cited

U.S. PATENT DOCUMENTS

| | | |
|---|---|---|
| 7,155,465 B2 | 12/2006 | Lee et al. |
| 7,246,254 B2 | 7/2007 | Alter et al. |
| 7,778,183 B2 | 8/2010 | Fan et al. |
| 7,895,161 B2 | 2/2011 | Sugimoto et al. |
| 2005/0131990 A1 | 6/2005 | Jewell |
| 2006/0248125 A1 | 11/2006 | Kawamura |

(Continued)

FOREIGN PATENT DOCUMENTS

WO    WO-2007/131190 A2    11/2007

OTHER PUBLICATIONS

Tivoli (Tivoli Storage Manager for UNIX Backup-Archive Clients Installation and User's Guide), IBM Corporation (Year: 1993).*

(Continued)

*Primary Examiner* — Etienne P Leroux
*Assistant Examiner* — Farhad Agharahimi
(74) *Attorney, Agent, or Firm* — Hewlett Packard Enterprise Patent Department

(57) ABSTRACT

A computer-implemented system or method for selecting a backup process for backing up a file system. The selection of a backup process can be based on multiple criteria, including an estimated completion time for each of multiple available backup processes.

17 Claims, 4 Drawing Sheets

(56) References Cited

U.S. PATENT DOCUMENTS

| | | |
|---|---|---|
| 2008/0027998 A1 | 1/2008 | Hara |
| 2008/0168111 A1 | 7/2008 | Lyon |
| 2011/0246731 A1 | 10/2011 | Ninose et al. |
| 2012/0233417 A1* | 9/2012 | Kalach ................ G06F 11/1453 711/162 |
| 2012/0331248 A1 | 12/2012 | Kono et al. |
| 2014/0380289 A1* | 12/2014 | Kalogeropulos ....... G06F 8/443 717/152 |

OTHER PUBLICATIONS

International Searching Authority, Appl. No. PCT/US2014/013827, Search Report and Written Opinion, 10pp, dated Oct. 29, 2014.
NovabAcKup® Datacenter, (Research Paper), Aug. 13, 2013, 4 Pages.

* cited by examiner

SELECTING A BACKUP PROCESS FOR A FILE SYSTEM

TECHNICAL FIELD

Examples described herein relate to selecting a backup process for a file system.

BACKGROUND

A typical enterprise network includes a number of high end servers that collectively provide multiple large and complex file systems. Each file system can include a large number of files of varying data size. A typical file system of the enterprise network can be characterized as being fully or partially occupied, or fully free (with only small number of files). In an operational environment, files are added, deleted and modified continuously by client computers of the enterprise network.

Enterprise networks routinely use one or more types of backup processes. An administrator of the network can manually select a backup process based on their respective knowledge of the structure of the file system, as well as the type of data that resides with the particular file system.

A file system backup refers to a process in which the files of the file system are backed up using the file system's application program interface (API). A raw image backup process, on the other hand, backs up and restores the underlying data blocks of the file system.

DETAILED DESCRIPTION

Figure 1:
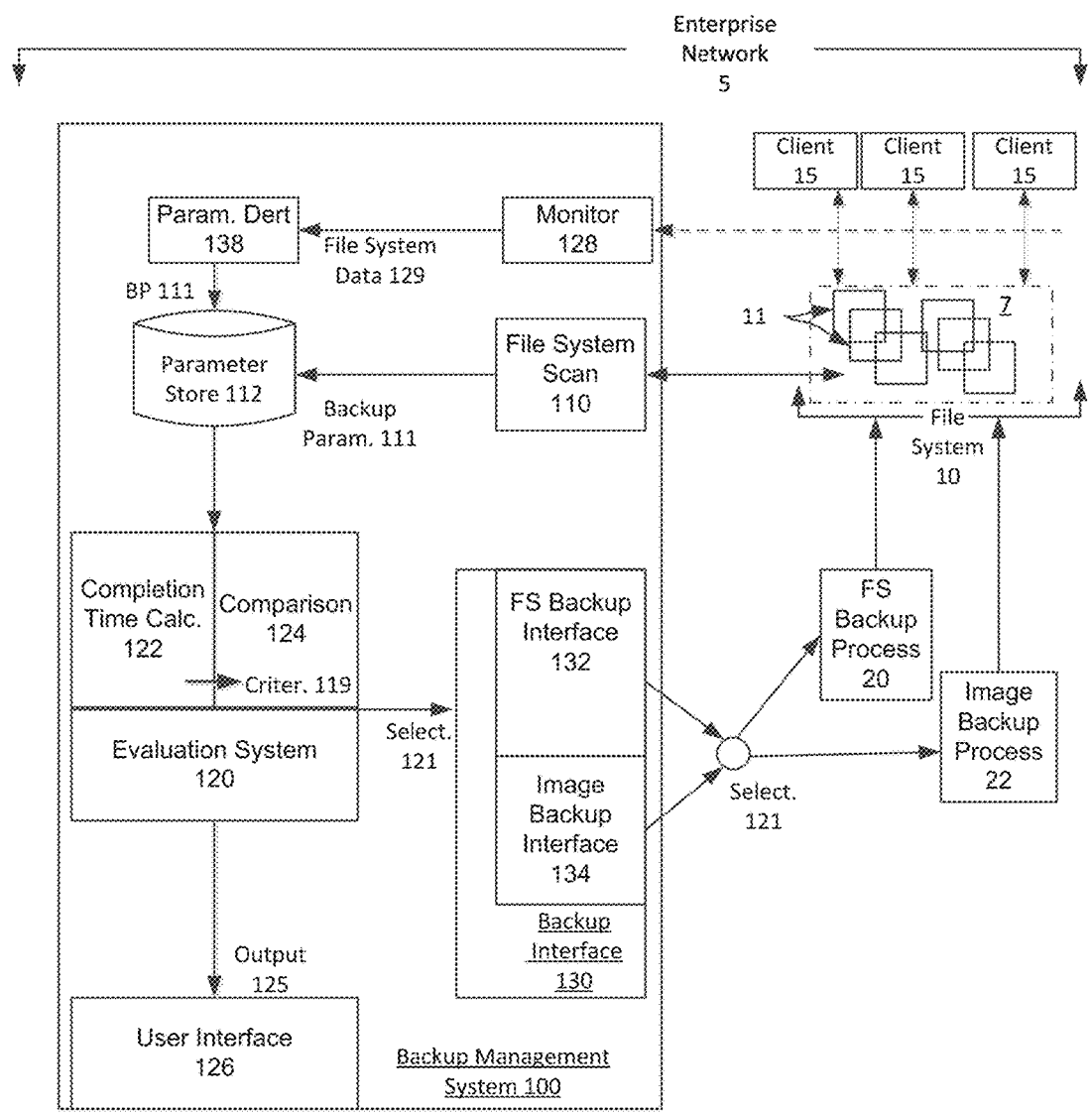
FIG. 1 illustrates an example system for selecting a backup process for a file system on an enterprise network.

Examples described herein include a computer-implemented system or method for selecting a backup process for backing up a file system or portion thereof. As described herein, the selection of a backup process can be based on multiple criteria, including an estimated completion time for each of multiple available backup processes.

According to one aspect, a completion time is estimated for performing each of a file system backup process and image backup process for at least a portion of a volume of a file system. A selection is made of one of the backup processes, based at least in part on the estimated completion time for each of the available backup processes. The selected backup process can be initiated to back up at least the portion of the volume of the file system.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets) and magnetic memory. Computers, terminals, and network-enabled devices (e.g. portable devices such as cell phones) are all examples of machines and devices that use processors, memory, and instructions stored on computer-readable mediums.

FIG. 1 illustrates an example system for selecting a backup process for a file system on an enterprise network. In more detail, the enterprise network 5 includes a file system 10, providing a collection of files 11. The files 11 can be provided with an organizational structure, such as a hierarchical arrangement in which files are associated with one another using horizontal and/or vertical relationships. Clients 15 of the enterprise network 5 can mount to a volume 7 of the file system 10 in order to access a portion of the file system 10. A backup management system 100 can be implemented as part of an enterprise network 5 in order to select a backup process for a given volume 7 of the file system 10. The enterprise network 5 can include components for implementing different kinds of backups, including a file system backup process 20 and an image backup process 22.

The backup management system 100 can include components corresponding to a file system scan 110, an evaluation subsystem 120, and a backup interface 130. The backup management system 100 operates to select one of the available backup processes (e.g., file system backup process 20, image backup process 22) based on one or more criteria. The criteria for selecting one of the available backup processes can include a comparison of an estimated time of completion as between the individual backup processes.

The file system 10 can be implemented by multiple servers. The volume 7 of file system 10 can be characterized by, for example, a relatively large number of small files, a relatively small number of large files, or a mix of large and small files. The volume 7 of file system 10 can also be characterized by its occupancy. By way of example, the file system volume 7 can be characterized as being fully or partially occupied, and/or fully free (so that only a small number of files 11 are part of the volume). The file system 10 can undergo frequent changes when the file system is in operation. For example, when the file system 10 is in the operational environment, file system operations can be received and processed from the clients 15. The file system operations can result in files 11 of the volume being added, deleted and/or modified.

Examples described herein recognize that as the file system 10 can undergo frequent changes, the time needed to perform a backup can increase, so that a backup process selected for a given volume 7 of file system 10 can become inefficient over time. Given the multiple numbers of servers that may be in use for the file system 10, the inadvertent use of an inefficient backup process can have unintended but severe consequences to the performance of the respective backup processes, as well as to the file system 10.

In an example of FIG. 1, the available backup processes for the enterprise network 5 can include the file system backup process 20 or the image backup process 22. The file system backup process 20 includes a process that communicates with a file system using appropriate commands (e.g., read( ), readdir( )). The file system backup process 20 can store and use folder information in order to perform a restore operation. Among its advantages, the file system backup process 20 can be performed selectively on the volume 7 of file system 10, so that only select files and folders are backed up. The image backup process 22, on the other hand, operates to store and restore the underlying data blocks of the file system 10. In typical circumstances, the raw image backup process 22 is faster to implement and complete on the given file system 10 than the file system backup process 20.

The backup management system 100 can implement file system scan 110 on the volume 7 of the file system 10 in order to obtain backup parameters 111. The backup parameters 111 can include values that are determined to affect the completion time of one or more of the available backup processes. The file system scan 110 can implement, for example, a tree spanning algorithm that obtains information both horizontally and vertically in the hierarchical structure of the file system 10. By way of example, the backup parameters 111 can include (i) the number of files that can or need to be backed up within the volume, (ii) the size of the individual files, (iii) an overall size of the volume, (iv) a percentage or other measure of the volume of the file system that is occupied, and/or (v) an amount of fragmentation that exists for the files on the disk of the file system. Fragmentation can include instances when a file has its data shared across multiple non-contiguous sectors of a single disk. If the file is not contiguously arranged on a given disk, then the file system is required to locate the individual sectors belonging to the particular file. As a result, in order to read a single file, the file system performs multiple seek operations that in turn negatively affect the performance of the file system backup. As illustrated by such an example, file system fragmentation can be a major computing factor that affects the performance of the file system backup process 20.

Figure 3:
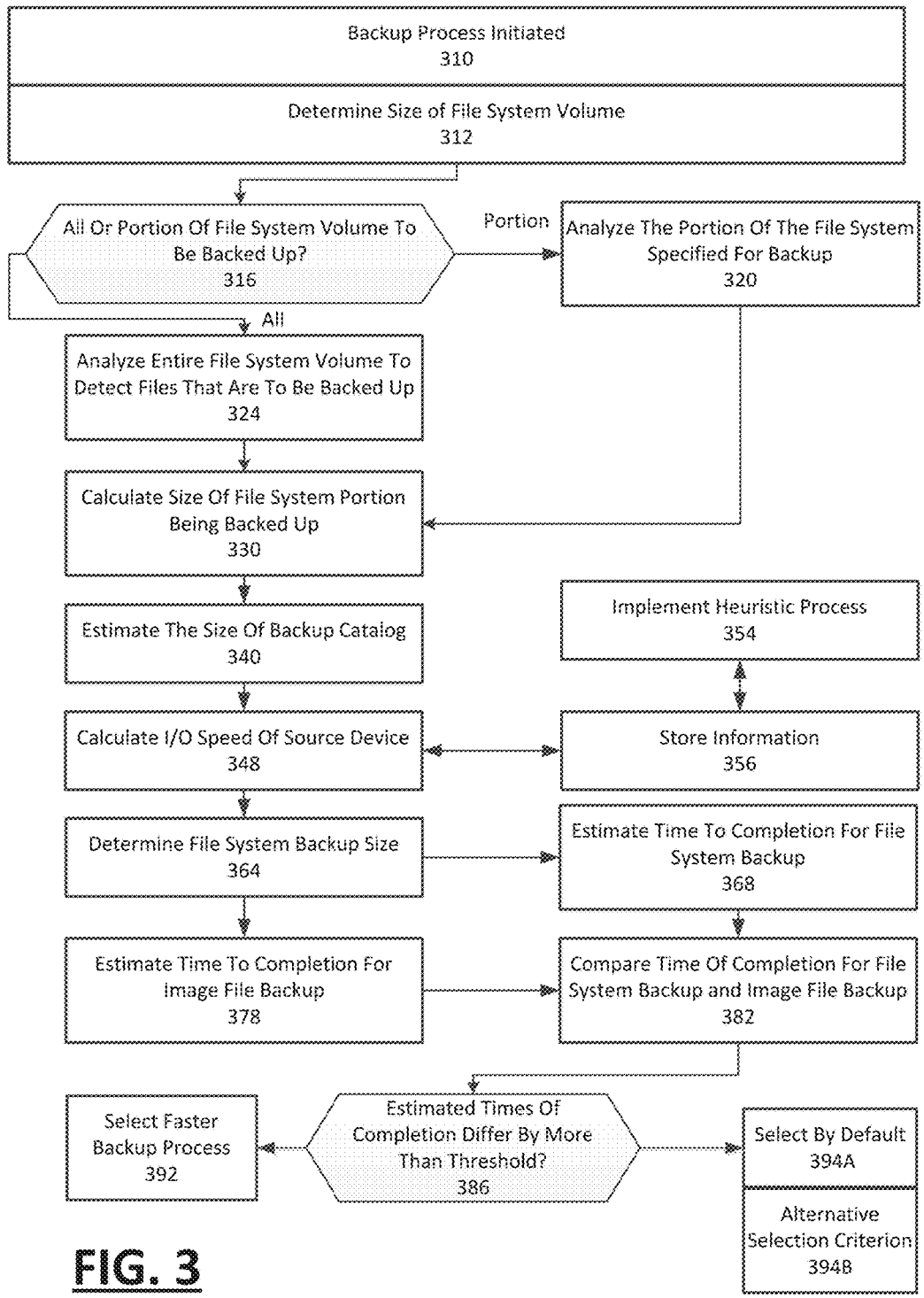
FIG. 3 illustrates an example method for selecting a backup process for a file system.

As described with an example of FIG. 3, additional backup parameters 111 can also include the I/O speed of the source device and/or the size of the backup catalog in use for the file system 10. In one implementation, file system scan 110 obtains data corresponding to backup parameters 111, and stores the data in the parameter store 112.

The evaluation subsystem 120 obtains the backup parameters 111 prior to selecting a particular backup process for the file system 10. For example, the evaluation subsystem retrieves the backup parameters 111 from the parameter store 112. The evaluation subsystem 120 can include components that correspond to an estimated completion time calculator 122 and a comparison component 124. The estimated completion time calculator 122 utilizes the backup parameters 111 to estimate a completion time for each backup process available to the file system 10. The comparison component 124 compares each backup process based on (i) criterion 119 that includes the estimated completion time, and/or (ii) other criteria that is determined or based on one or more of the backup parameters 111. For example, in some variations, other criteria such as the amount of fragmentation present in the file system 10, the number of files 11 in the file system 10, and/or the percentage of the volume available in the file system 10 can be used as additional and independent criteria 119 to weight or otherwise select one of the available backup processes at a given instant.

In one implementation, evaluation subsystem 120 outputs a selection 121 of one of the backup processes, identifying the backup process that is selected to backup the file system 10 at a present moment. The selected backup process can be deemed to be the backup process that best satisfies criteria, such as completion time efficiency, or costs related parameters (e.g., minimal effect on file system operations). In one implementation, the default backup process is pre-selected as having the least impact on the availability of the file system 10, and the evaluation subsystem 120 selects the default backup process unless other criteria indicate a better alternative (e.g., image backup process 22 is expected to be significantly faster). In an example of FIG. 1, the file system backup process 20 is implemented by default, unless image backup process 22 is significantly faster. In variations, the selected backup process is the one that has the fastest estimated completion time, without regard for a threshold.

With further reference to FIG. 1, the backup interface 130 includes a file system backup interface 132 and an image backup interface 134. The file system backup interface 132 can communicate with and initiate the file system backup process 20. The image backup interface 134 can communicate with and initiate the image backup process 22. In implementation, the backup interface 130 communicates with the application program interface ("API") of the backup manager or controller inherent with the file system 10. The backup interface 130 receives selection 121 from the evaluation subsystem 120. In response, the selected backup process (e.g., file system backup process 20, image backup process 22) is signaled by the respective file system backup interface 132 or image backup interface 134. The selected backup process can then be implemented on the file system 10.

While an example of FIG. 1 illustrates the selected backup process as being initiated by the backup management system 100, in variations, the backup management system 100 can provide an output that allows for an administrator to intelligently select the backup process to implement for the file system 10 at a current moment. In one implementation, the backup management system 100 includes a user interface 126 which displays output 125 corresponding to the selection of the particular backup process. The output 125 can include, or be based on results determined from, for example, the estimated completion times of the respective backup processes (as determined by the completion time calculator 122) and/or comparisons as between completion times (as determined by the comparison component 124). The output 125 can be displayed to the user (administrator) via the user interface 126 in order to enable the user to make the ultimate selection of one of the backup processes.

In one variation, the backup management system 100 can include a monitor 128 (or other filter) to monitor for changes to the file system 10. By way of example, the monitor 128 can detect or observe modifications that alter the files 11 (e.g., write( )) or contents of volume 7. The monitor 128 can communicate file system data 129 to a parametric determination component 138, which processes the data to determine values for the backup parameters 111. In this way, some implementations enable the parameter store 112 to be heuristically maintained without requiring the file system 10 to be repeatedly scanned. Rather, the file system data 129 can be obtained from the monitor 128 (or other file system filter), and this data can be used to determine the backup parameters 111 in near real-time and on an ongoing basis.

Figure 2:
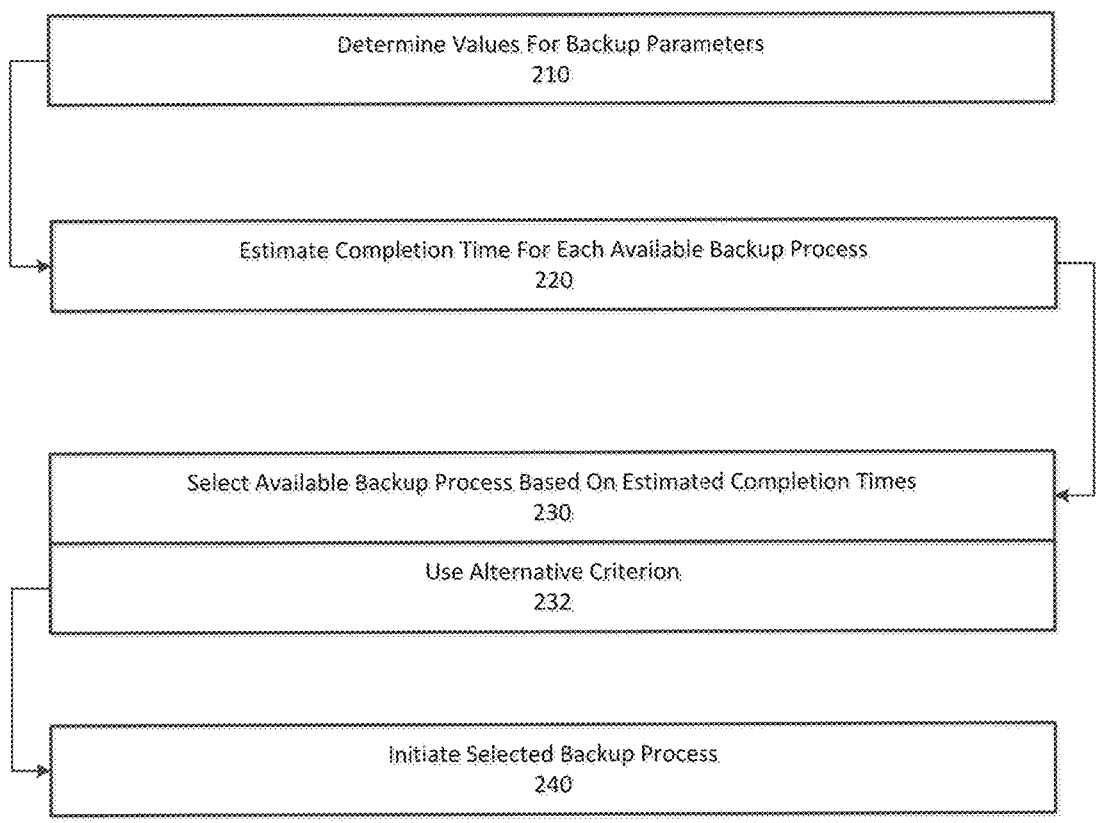
FIG. 2 illustrates an example method for backing up a file system.

FIG. 2 illustrates an example method for backing up a file system. FIG. 3 illustrates an example method for selecting a backup process for a file system. In describing examples of FIG. 2 and FIG. 3, reference may be made to elements of FIG. 1 for purpose of illustrating suitable components or elements for performing a step or sub-step that is being described.

With reference to FIG. 2, values are determined for a set of backup parameters which can affect the completion time of available backup processes (210). Examples described herein recognize that in a given enterprise network 5, the completion time for performing a file system backup process 20 can fluctuate based on various parameters, such as the number of files 11 maintained with a given volume 7, amount of fragmentation present, etc. In contrast, the completion time for performing the image backup process 22 is relatively constant. Accordingly, the determination of the backup parameters can include determining parameters that primarily affect the file system backup process 22. By way of example, the parameters can include: (i) a number of files 11 on the file system 10, (ii) the size of the individual files, (iii) an overall size of the volume, (iv) a percentage of the volume of the file system 10 that is occupied, (v) an amount of fragmentation in the memory resources that provide the file system 10, (vi) the I/O speed for the source device(s) of the file system 10, and/or (vii) a size of the backup catalog for the file system 10 (e.g., generated by prior backup processes).

The backup management system 100 can be used to determine the values of the backup parameters 111. In one implementation, the values of the backup parameters 111 are determined by implementing a file system scan 110 on the volume 7 of the file system 10. The file system scan can implement, for example, a tree spanning algorithm that traverses the nodes of the file system 10 in order to identify the individual files 11 of the volume 7. Additionally, the tree spanning algorithm can identify the individual files 11 in accordance with the structure (e.g., hierarchical) of the volume 7 of the file system 10. In this way, the value the backup parameters 111 can be determined on an ongoing basis, using filters such as provided by monitor 128. The monitor 128 can detect and observe the file system operations that affect the files 11 (or contents thereof) of the file system 10. File system data 129 generated by the monitor 128 can be processed in order to determine updated values for the backup parameters 111. In this way, the backup management system 100 can avoid performing a scan of the file system 10 on each occasion in which a backup process is to be selected.

The backup parameters 111 are used to estimate a completion time for performing each of the file system backup process 20 or image back process 22 on the volume 7 of the file system 10 (220). By way of example, the evaluation subsystem 120 can estimate a completion time for performing each one of the file system backup process 20 and image backup process 22. According to one aspect, the estimated completion time can be determined on a case-by-case basis specifically for the file system backup process 20, as the completion time for the file system backup process can fluctuate based on various parameters obtained in (210). The completion time for the image backup process 22 can be treated as a constant or known value, equal to, for example, completion time from when the image backup process 22 was previously performed.

One of the available backup processes is selected based on the estimated completion time for each of the backup processes (230). In one implementation, a default backup process is selected unless the alternative backup process is deemed to be faster by a measure that exceeds a threshold (e.g., 20% faster). In a variation, the backup process that is fastest in terms of completion time is selected.

In variations, the selection of the backup process can be based at least in part on criterion other than estimated completion time (232). For example, the number of files 11 that are present in the volume 7 of the file system 10 can be used to select (or weight selection of) one backup process over another. As an alternative or variation, an amount of fragmentation present with the file system 10 can be used to select (or weight selection of) one backup process over another.

The selected backup process can then be initiated (240). In one implementation, the backup management system 100 can interface with and select the backup process that is to be used to backup the file system 10. The backup management system can signal and initiate the selected backup process in response to selection of one of the available backup processes.

As an alternative or variation, the backup management system 100 can provide output 125 to the user (e.g., administrator) for purpose of enabling the user to make an intelligent decision on which backup process to execute on the file system 10. For example, the output 125 can identify the estimated time of completion for each backup process and/or indication of which backup process is faster and by how much. The administrator can then select the backup process on the information provided via the output 125.

While an example of FIG. 2 bases the decision criteria for selecting one of multiple available backup process is being completion time, other examples may use other criteria, with or without the inclusion of completion time. For example, the image backup process 22 can be implemented when the number of files 11 in the file system 10 exceeds a certain threshold (e.g., 5 million). Similarly, if the fragmentation of the files 11 on the discs used to provide a file system 10 exceeds some quantitative measure that corresponds to a threshold, then the fragmentation may be deemed excessive and the image backup process 22 can be implemented in place of the file system backup process 20. This threshold can also serve as an independent criterion for selecting the image backup process 22 over the file system backup process 20. Still further, some examples provide for performing the file system backup process 20 if each of the completion time, number of files, and amount of fragmentation satisfy a predefined criteria or threshold. For example, if (i) the completion time for the file system backup process 20 is faster than the image backup process 22, and (ii) the number of files 11 in the file system 10 is less than a threshold, and (iii) the amount of fragmentation present on the file system 10 is less than a threshold, then the file system backup process 20 is performed in place of the image backup process 22.

With reference to FIG. 3, a selection process is initiated to select the backup process for the volume 7 of the file system 10 at a given instance (310). The selection process can be performed by, for example, the backup management system 100, as shown by an example of FIG. 1. Once the selection process is initiated, the size of the file system volume 7 is determined (312). In one implementation, the size of the file system volume is determined by signaling one or more file system operations through an API of the file system 10. As described below, the size of the file system volume can correspond to a backup parameter that can be used in estimating, for example, the completion time for performing an image backup of the file system 10.

A determination can be made as to whether the backup process is to backup a portion or all of the file system volume (316). In one implementation, this determination can be provided by a user, such as an administrator of the enterprise network 5. In a variation, the input can be based on other criteria, such as time between the current and past backup, the portion of the file system 10 that was backed up previously, and/or the amount of file system activity between backups. Still further, the determination as to the extent of the backup can be based on a policy implementation of the enterprise network 5.

If the determination is that only a portion of the file system volume is to be backed up, then an analysis is performed on that portion of the file system (320). If the determination is that the entire file system volume is to be backed up, then the analysis is performed on the entire file system volume for purpose of determining all of the files that are to be backed up (324). As part of analysis of the file system volume or portion thereof, values for backup parameters 111 can be identified that include: (i) a number of files that are added, deleted or modified on a particular mount point of the file system volume; (ii) a size of each file; (iii) an amount of free space on the file system volume; and (iv) the amount of fragmentation. The analysis of the file system volume (or portion thereof) can include (i) scanning the file system for information corresponding to the backup parameters 111, and/or (ii) obtaining and analyzing information from filters, such as monitor 128 in FIG. 1. For example, a file system scan can be performed on file system 10 to determine information corresponding to the backup parameters 111, and as described in step (356), this information can be recorded in parameter data store 112. After the initial file system scan, the monitor 128 (or other file system filter) can update the information for the backup parameters 111 based on detected file system activity (e.g., operations specified by clients 15 on the file system 10). In one aspect, when the analysis is performed on the file system 10 or portion thereof (per steps 320, 324), the updated information for the backup parameters 111 can be obtained from the parameter store 112, unless the initial file system scan has not yet been performed. Still further, on occasion, data obtained from the monitor 128 can be corrupted, or other issues may be presented that require re-performing the file system scan in order to determine the backup parameters 111.

Still further, some variations provide for scanning the file system 10 unless this scanning process exceeds a threshold time limit, in which case information from monitors 128 can be used (e.g., information stored in the parameter data store 112). In such implementations, the file system backup process 20 can automatically be aborted in favor of the image backup process 22.

The size of the file system portion that is to be backed up is calculated (330). The size of the file system portion can be determined by information obtained when the relative portion of the file system is a scanned. The calculation can provide another one of the backup parameters 111 for estimating completion time of individual backup processes.

In one implementation, a size of the backup catalog is also determined (340). The backup catalog refers to a data structure of metadata that reflects the structure and/or contents of the file system 10. The backup catalog can be developed by prior implementation of the file system backup processes. As such, the size of the backup catalog corresponds to another backup parameter 111 that affects the completion time of one or more of the available backup processes. An example such as described with FIG. 3 recognizes that a backup catalog can grow significantly in size with file additions and complexities to file system 10. For example, the backup catalog includes records of individual files, with information such as filenames, file paths and other metadata. In this regard, a large backup catalog can increase the completion time for performing a file system backup process.

Additionally, the I/O speed of the source device can be calculated (348). The I/O speed of the source device is another example of a backup parameter 111. The determination of this parameter can be based on the performance specifications of individual servers that maintain the file system 10, as well as other factors such as the amount of traffic or load present on the servers when the backup processes is performed. If the assumption is made that the backup process is performed when the servers are least in use (e.g., late at night), then the estimated I/O speed can also be assumed as a near maximum I/O speed of the particular resource.

As mentioned, in one aspect, respective values for the backup parameters 111 can be stored in a data structure (356). The values can be determined from performing the file or from data obtained from a filter such as monitor 128. In particular, the backup parameters determined by (310)-(348) can be stored in, for example, the data store 112. In this way, a heuristic process can be implemented in which the file system 10 is monitored or observed, and data that affects changes to the values of the backup parameters are identified and stored (354). Such values can identify, for example, (i) the number of files that are added, deleted or modified on a particular mount point of the file system volume; (ii) an update as to the size of each file; (iii) a current assessment as to the amount of free space on the file system volume; and (iv) a current assessment as to amount of fragmentation. Other parameter values such as the size of the volume, the size of the backup catalog and the I/o speed of the source device can also be stored in the data structure.

The file system backup size can be determined. In one implementation, the completion time calculator 122 can determine the file system backup size as a sum of the sizes of the files/directories that are to be backed up and the size of the backup catalog (364).

The completion time for performing the file system backup process can then be estimated. In one implementation, the completion time calculator 122 calculates the completion time of the file service backup process 20 as a ratio of the backup size and the estimated I/O speed of the source device (368).

The completion time for performing the image backup process can also be estimated (374). In one implementation, the completion time calculator 122 calculates the completion time for the image backup process 22 as a ratio of the volume size (see 312) and the estimated I/O speed for the source device.

The estimated completion times for each of the respective backup processes is then compared (382). With further reference to an example of FIG. 1, the comparison component 124 of the evaluation subsystem 120 compares implementation of each backup process. In particular, the comparison component 124 uses the estimated completion times of each of the backup processes as a basis for comparison and selection.

In an aspect, a determination is made as to whether the completion times of the respective backup processes differ by an amount that exceeds a threshold (386). In other words, the determination can be made as to whether the completion tie of one backup process is significantly different than the completion time of the other backup process. In one implementation, if the difference between completion times for the respective backup processes is significant (e.g., difference in completion times is greater than a threshold), then the faster backup process is performed (392). Otherwise, in one implementation, if the difference between completion times of the respective backup processes is not significant (e.g., difference in completion times is less than the threshold) then a default backup process is performed (394A). For example, the file system backup process 20 can be performed by default unless the image backup process 22 is deemed significantly faster.

In a variation, the backup process is selected based on another selection criterion (394). In one implementation, the alternative selection criterion can correspond to the amount of fragmentation with the resources of the file system 10. For example, if the volume of the file system is relatively very fragmented, then the image backup process is selected. As an alternative or variation, the selection criterion can be based on whether a number of files 11 in the file system 10 exceeds a threshold (e.g., exceeds millions).

Figure 4:
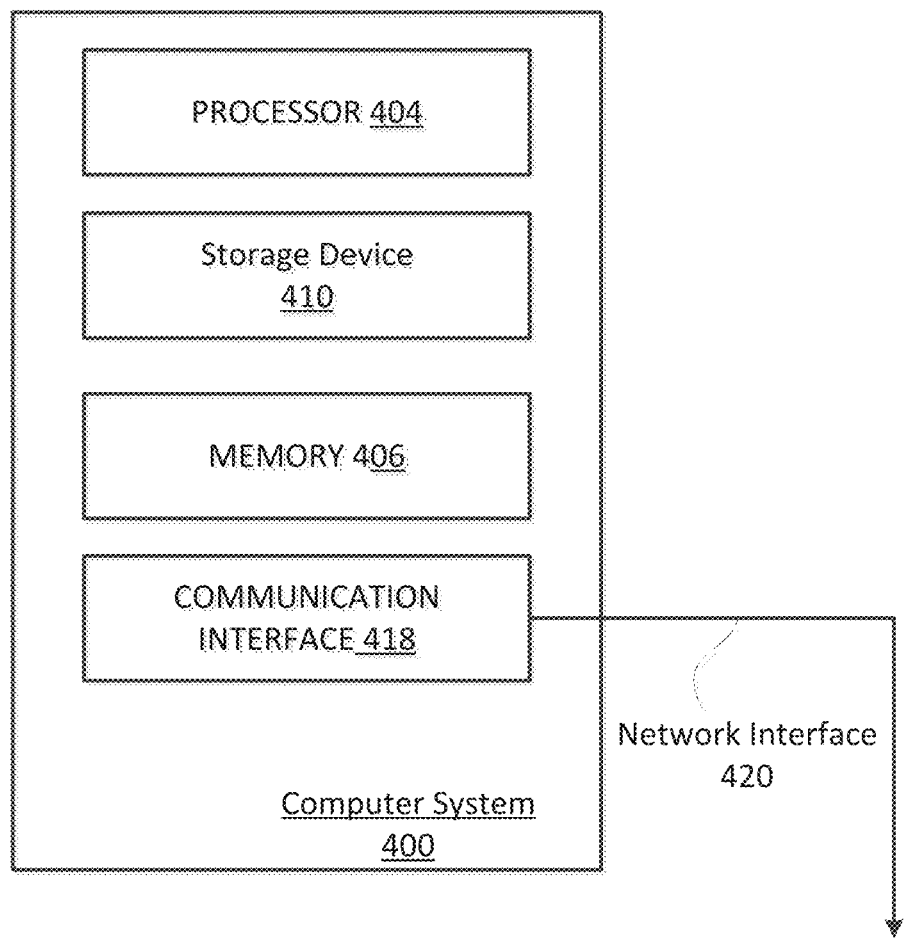
FIG. 4 is a block diagram that illustrates a computer system upon which examples described herein may be implemented.

FIG. 4 is a block diagram that illustrates a computer system upon which examples described herein may be implemented. For example, a system such as described with FIG. 1 can be implemented on a computer system such as described with an example of FIG. 4. Likewise, a method such as described with an example of FIG. 2 or FIG. 3 can also be implemented using a system such as described with FIG. 4.

In an embodiment, computer system 400 includes processor 404, memory 406 (including non-transitory memory), storage device 410, and communication interface 418. Computer system 400 includes at least one processor 404 for processing information. The memory 406 can include a random access memory (RAM) and/or other dynamic storage device, for storing information and instructions to be executed by processor 404. The memory 406 can also be used for storing temporary variables or other intermediate information during execution of instructions to be executed by processor 404. The memory 406 can also include a read only memory (ROM) or other static storage device for storing static information and instructions for processor 404. A storage device 410, such as a magnetic disk or optical disk, is provided for storing information and instructions. The communication interface 418 may enable the computer system 400 to communicate with one or more networks through use of the network link 420 (wireless or wireline).

In one implementation, memory 406 may store instructions for implementing functionality such as described with an example of FIG. 1, or implemented through an example method such as described with FIG. 2 or FIG. 3. Likewise, the processor 404 may execute the instructions in providing functionality as described with a system such as described with FIG. 1, or with example methods such as described with FIG. 2 or FIG. 3.

Embodiments described herein are related to the use of computer system 400 for implementing the techniques described herein. According to one embodiment, those techniques are performed by computer system 400 in response to processor 404 executing one or more sequences of one or more instructions contained in the memory 406. Such instructions may be read into memory 406 from another machine-readable medium, such as storage device 410. Execution of the sequences of instructions contained in memory 406 causes processor 404 to perform the process steps described herein. In alternative embodiments, hardwired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium that stores instructions, that when executed by one or more processors, causes the one or more processors to perform operations comprising:
    estimating a completion time for performing each of a file system backup process and image backup process for backing up at least a portion of a volume of a file system;
    selecting one of the file system backup process or the image backup process to back up the volume of the file system,
    wherein selecting is based at least in part on the estimated completion time for each of the file system backup process and image backup process; and
    initiating performance of the selected one of the file system backup process or the image backup process on at least the portion of the volume of the file system.

2. The computer-readable medium of claim 1, wherein the estimating the completion time for performing each of the file system backup process or image backup process includes scanning the volume of the file system in order to determine values for a set of backup parameters that affect the completion time of each of the file system backup process and image backup process.

3. The computer-readable medium of claim 1, wherein the estimating the completion time for performing each of the file system backup process and image backup process includes determining a number of files and a file size of each file of at least the portion of the volume.

4. The computer-readable medium of claim 1, wherein the estimating the completion time for performing each of the file system backup process and image backup process includes determining a size of a system backup for the at least the portion of the volume of the file system.

5. The computer-readable medium of claim 1, wherein estimating the completion time for performing each of the file system backup process and image backup process includes determining a size of a backup catalog for the volume of the file system.

6. The computer-readable medium of claim 1, wherein estimating the completion time for performing each of the file system backup process and image backup includes estimating an I/O speed of one or more source devices of the file system.

7. The computer-readable medium of claim 1, wherein selecting one of the file system backup process or the image backup process includes comparing the estimated completion time of each of the file system backup process and image backup process in order to determine whether the respective estimated completion times differ by an amount that exceeds a threshold.

8. The computer-readable medium of claim 1, wherein selecting one of the file system backup process or the image backup process includes:
when the estimated completion time of each of the file system backup process and image backup process is less than a threshold, then selecting one of the file system backup process or the image backup process by default.

9. The computer-readable medium of claim 1, wherein selecting one of the file system backup process or the image backup process includes:
when the estimated completion time of each of the file system backup process or image backup process is less than a threshold, then selecting one of the file system backup process or the image backup process based on an alternative criterion.

10. The computer-readable medium of claim 9, wherein the alternative criterion includes one of (i) a number of files in the at least portion of the volume of the file system, and/or (ii) an amount of fragmentation of the volume of the file system.

11. The computer-readable medium of claim 1, wherein the instructions, when executed by the one or more processors, further cause the one or more processors to perform operations that include maintaining, in a data store, values for a set of backup parameters that affect the completion time of each of the file system backup process and image backup process, and wherein the estimating the completion time includes using the values for the set of backup parameters that are maintained in the data store.

12. The computer-readable medium of claim 11, wherein the maintaining values for the set of backup parameters includes performing a scan of the volume of the file system in order to determine the values at a first instance.

13. The computer-readable medium of claim 11, wherein the maintaining values for the set of backup parameters includes monitoring the volume of the file system and its use in order to update the data store to include an updated values for the set of backup parameters.

14. The computer-readable medium of claim 1, wherein the file system backup process backs up files of the volume of the file system using an application programming interface (API) of the file system.

15. The computer-readable medium of claim 14, wherein the image backup process backs up underlying data blocks of the volume of the file system.

16. A method for performing a backup of a volume of a file system, the method being implemented by one or more processors and comprising:
estimating a completion time for performing each of a file system backup process and image backup process for backing up at least a portion of a volume of a file system;
selecting one of the file system backup process or the image backup process to back up the at least portion of the volume of the file system, based at least in part on the estimated completion time for one of the file system backup process or image backup process; and
initiating performance of the selected one of the file system backup process or the image backup process on the volume of the file system.

17. A computer system comprising:
a memory, including memory to store a set of instructions;
one or more processors that use instructions from the set of instructions in order to:
estimate a completion time for performing each of a file system backup process and image backup process for backing up at least a portion of a volume of a file system;
select one of the file system backup process or the image backup process to back up at least the portion of the volume of the file system, based at least in part on the estimated completion time for one of the file system backup process or image backup process; and
initiate performance of the selected one of the file system backup process or the image backup process on the volume of the file system.

* * * * *